(12) United States Patent
Kim et al.

(10) Patent No.: US 12,494,545 B2
(45) Date of Patent: Dec. 9, 2025

(54) POUCH-SHAPED BATTERY CELL INCLUDING SEALED PORTION VENTING ADJUSTMENT MEANS

(71) Applicant: LG Energy Solution, Ltd., Seoul (KR)

(72) Inventors: Hye Hyeon Kim, Daejeon (KR); Jung Noh Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 559 days.

(21) Appl. No.: 18/003,590

(22) PCT Filed: Jun. 2, 2022

(86) PCT No.: PCT/KR2022/007859
§ 371 (c)(1),
(2) Date: Dec. 28, 2022

(87) PCT Pub. No.: WO2022/255822
PCT Pub. Date: Dec. 8, 2022

(65) Prior Publication Data
US 2023/0253665 A1    Aug. 10, 2023

(30) Foreign Application Priority Data
Jun. 2, 2021 (KR) .......... 10-2021-0071585

(51) Int. Cl.
*H01M 50/325* (2021.01)
*H01M 50/105* (2021.01)
(Continued)

(52) U.S. Cl.
CPC ....... *H01M 50/325* (2021.01); *H01M 50/105* (2021.01); *H01M 50/186* (2021.01); *H01M 50/553* (2021.01)

(58) Field of Classification Search
CPC ............. H01M 50/325; H01M 50/186; H01M 50/105; H01M 50/553
See application file for complete search history.

(56) References Cited

U.S. PATENT DOCUMENTS

| | | |
|---|---|---|
| 6,187,472 B1 | 2/2001 | Shiota et al. |
| 10,008,702 B2 | 6/2018 | Kepler et al. |

(Continued)

FOREIGN PATENT DOCUMENTS

| | | | | |
|---|---|---|---|---|
| CN | 111342103 A | 6/2020 | | |
| DE | 102014018751 A1 | * 6/2016 | .......... | H01M 50/325 |

(Continued)

OTHER PUBLICATIONS

Machine Translation of JP-2006332009-A (Sep. 9, 2025) (Year: 2025).*

(Continued)

*Primary Examiner* — Matthew J Merkling
(74) *Attorney, Agent, or Firm* — Lerner David LLP

(57) ABSTRACT

The present invention relates to a pouch-shaped battery cell including an electrode assembly with a venting adjustment member. The pouch-shaped battery case can be configured to receive the electrode assembly, with an electrode lead extending from the electrode assembly. A part of the electrode lead can protrude outwards from the pouch-shaped battery case. A sealed portion can be formed at an outer periphery of the pouch-shaped battery case. The venting adjustment member can be mounted to a part of the sealed portion in a direction in which the electrode lead protrudes. The venting adjustment member is configured to adjust opening and closing of the sealed portion having the venting adjustment member mounted thereto based on the pressure of gas in the pouch-shaped battery case.

11 Claims, 4 Drawing Sheets

(51) Int. Cl.
  *H01M 50/186* (2021.01)
  *H01M 50/553* (2021.01)

(56) References Cited

U.S. PATENT DOCUMENTS

| | | | |
|---|---|---|---|
| 12,046,763 B2 * | 7/2024 | Kim | H01M 50/242 |
| 2006/0051658 A1 | 3/2006 | Otohata et al. | |
| 2007/0207377 A1 | 9/2007 | Han et al. | |
| 2009/0017365 A1 | 1/2009 | Miyahisa et al. | |
| 2010/0239895 A1 | 9/2010 | Yang et al. | |
| 2012/0196161 A1 | 8/2012 | Yang et al. | |
| 2015/0079436 A1 * | 3/2015 | Chung | H01M 50/367 |
| | | | 429/87 |
| 2016/0036024 A1 | 2/2016 | Choi et al. | |
| 2016/0315301 A1 * | 10/2016 | Kim | H01M 50/3425 |
| 2016/0344004 A1 * | 11/2016 | Kepler | H01M 50/317 |
| 2018/0114964 A1 | 4/2018 | Kim et al. | |
| 2018/0241023 A1 | 8/2018 | Lim et al. | |
| 2020/0235360 A1 | 7/2020 | Lim et al. | |
| 2020/0287186 A1 | 9/2020 | Kim et al. | |
| 2021/0359353 A1 | 11/2021 | Dunn | |
| 2022/0393299 A1 | 12/2022 | Ryu et al. | |
| 2023/0198083 A1 | 6/2023 | Noh | |

FOREIGN PATENT DOCUMENTS

| | | | | |
|---|---|---|---|---|
| EP | 4138195 | A1 | | 2/2023 |
| JP | H10294097 | A | | 11/1998 |
| JP | 2004055290 | A | | 2/2004 |
| JP | 2006332009 | A | * | 12/2006 |
| JP | 2007087922 | A | | 4/2007 |
| JP | 2007157678 | A | | 6/2007 |
| JP | 2007200717 | A | * | 8/2007 |
| JP | 2008166130 | A | | 7/2008 |
| JP | 2010225496 | A | | 10/2010 |
| JP | 2015090804 | A | | 5/2015 |
| JP | 2015165557 | A | | 9/2015 |
| JP | 2018006182 | A | | 1/2018 |
| JP | 6735074 | B2 | | 8/2020 |
| KR | 20070025391 | A | | 3/2007 |
| KR | 100900411 | B1 | | 6/2009 |
| KR | 101082196 | B1 | * | 11/2011 | H01M 50/367 |
| KR | 101245282 | B1 | * | 3/2013 | H01M 50/531 |
| KR | 101520148 | B1 | | 5/2015 |
| KR | 101610411 | B1 | | 4/2016 |
| KR | 101858790 | B1 | | 6/2018 |
| KR | 101904587 | B1 | | 10/2018 |
| KR | 101927390 | B1 | | 12/2018 |
| KR | 20190002992 | A | | 1/2019 |
| KR | 20190042215 | A | | 4/2019 |
| KR | 20200001052 | A | | 1/2020 |
| KR | 102112670 | B1 | | 5/2020 |
| KR | 20210058159 | A | | 5/2021 |
| WO | 2020081372 | A1 | | 4/2020 |

OTHER PUBLICATIONS

Machine Translation of JP-2007200717-A (Sep. 9, 2025) (Year: 2025).*
Machine Translation of KR-101082196-B1 (Sep. 9, 2025) (Year: 2025).*
Machine Translation of KR-101245282-B1 (Sep. 9, 2025) (Year: 2025).*
Machine Translation of DE-102014018751-A1 (Sep. 9, 2025) (Year: 2025).*
International Search Report for Application No. PCT/KR2022/007859 mailed Sep. 8, 2022, pp. 1-3.
Extended European Search Report including Written Opinion for Application No. 22816481.0 dated Sep. 27, 2024, pp. 1-9.

* cited by examiner

[FIG. 1]
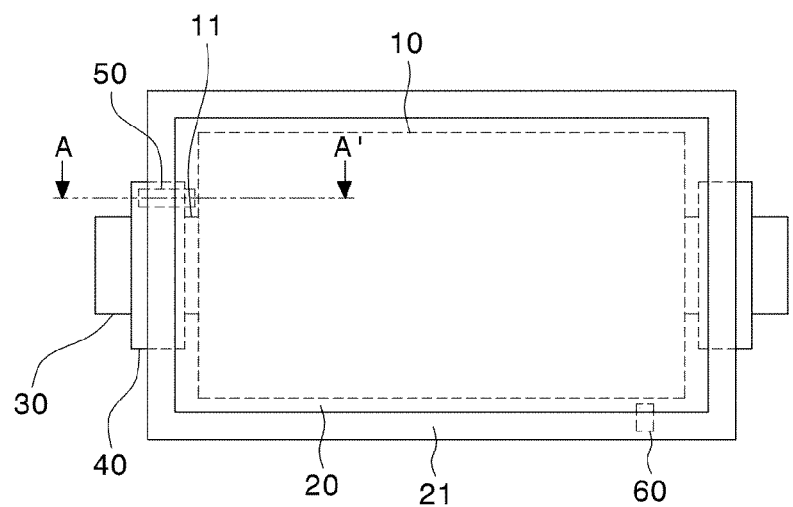
[FIG. 2]
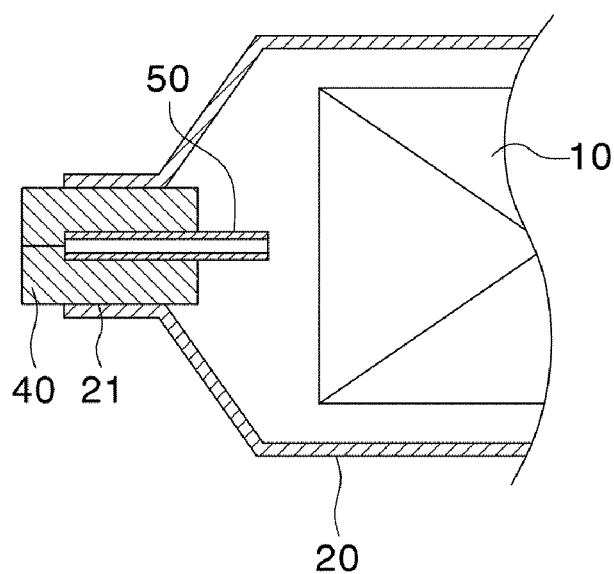

[FIG. 3]
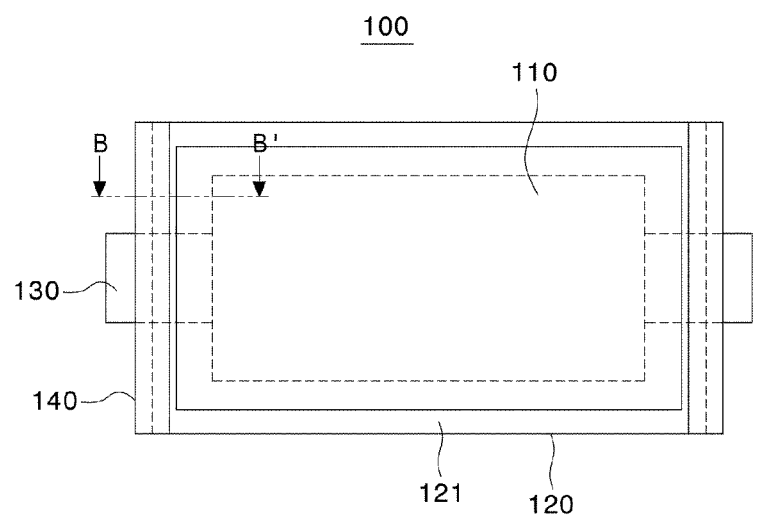
[FIG. 4]
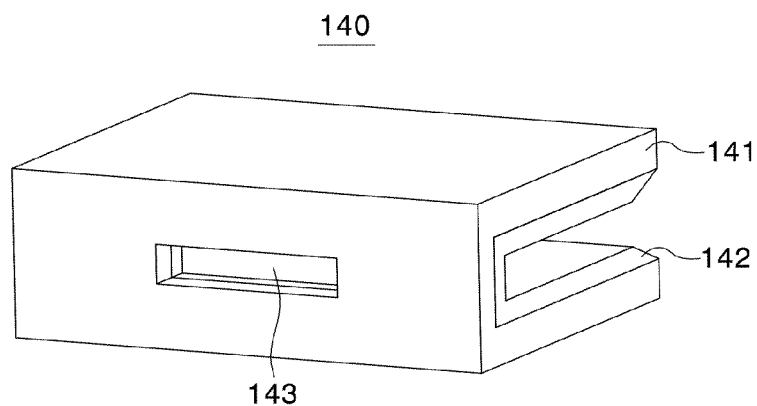

[FIG. 5]
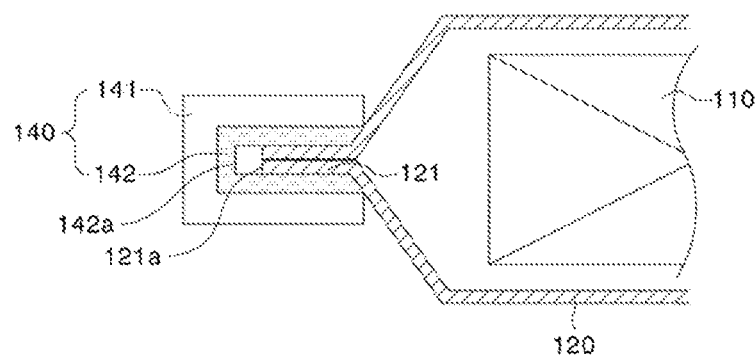
[FIG. 6]
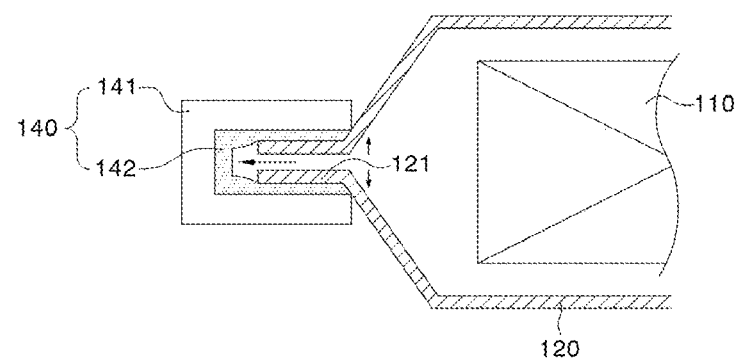

[FIG. 7]
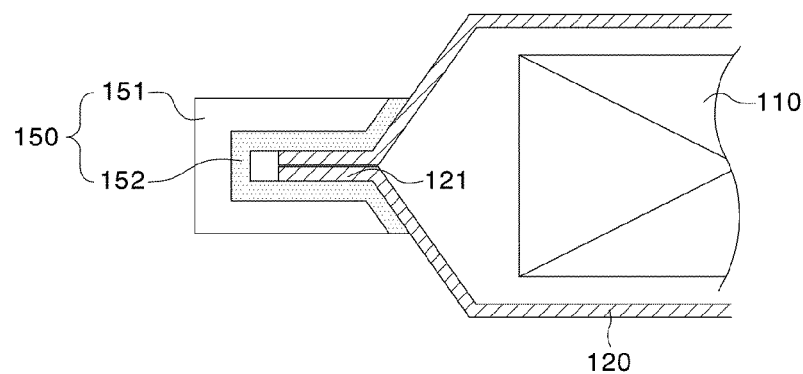

POUCH-SHAPED BATTERY CELL INCLUDING SEALED PORTION VENTING ADJUSTMENT MEANS

CROSS-REFERENCE TO RELATED APPLICATIONS

This application is a national phase entry under 35 U.S.C. § 371 of International Application No. PCT/KR2022/007859 filed on Jun. 2, 2022, which claims the benefit of priority to Korean Patent Application No. 10-2021-0071585 filed on Jun. 2, 2021, the disclosures of which are incorporated herein by reference in their entirety.

TECHNICAL FIELD

The present invention relates to a pouch-shaped battery cell including a sealed portion venting adjustment means. More particularly, the present invention relates to a pouch-shaped battery cell including a venting adjustment means provided at a sealed portion of the pouch-shaped battery cell so as to adjust discharge of gas depending on the pressure in the pouch-shaped battery cell.

BACKGROUND ART

There are a lithium ion battery, a lithium polymer battery, a nickel-cadmium battery, a nickel-hydride battery, and a nickel-zinc battery as secondary batteries. The operating voltage of a unit cell of the secondary battery is about 2.0V to 5.0V. When output voltage higher than the above operating voltage is required, therefore, a plurality of unit cells may be connected to each other in series to constitute a cell assembly. In consideration of output voltage and capacity, cell assemblies may be connected to each other in series and/or in parallel to constitute a battery module, and a battery pack may be manufactured using a plurality of battery modules.

The secondary batteries may be classified into a cylindrical battery, a prismatic battery, and a pouch-shaped battery based on the shape of a battery case. Among these batteries, the pouch-shaped battery, which can be stacked with high integration, has high energy density per unit weight, is inexpensive, and can be easily deformed, has attracted considerable attention. A pouch-shaped battery cell, which means a battery cell configured such that a battery case is made of a laminate sheet, has a structure in which an electrode assembly is mounted in the battery case.

The pouch-shaped battery cell has a danger in that gas is generated in the battery cell during use thereof, such as charging and discharging, whereby the pouch-shaped battery case may swell and explode.

In order to prevent such a danger, as shown in FIGS. 1 and 2, Patent Document 1 discloses a battery cell configured such that a main gas discharge pipe 50 and an auxiliary gas discharge pipe 60 are provided at a sealed portion 21 of a battery case 20 in order to rapidly discharge gas generated in the battery cell to the outside.

The battery cell of Patent Document 1 is manufactured through a step of performing sealing in the state in which the main gas discharge pipe 50 is located at the sealed portion, a part of the sealed portion 21 is incised to expose a part of the main gas discharge pipe 50 and gas is discharged to the outside through the exposed part of the main gas discharge pipe at the time of gas discharge, and the exposed part of the main gas discharge pipe 50 is hermetically sealed by thermal fusion when gas discharge is completed. As a result, the process is complicated, and productivity is lowered.

PATENT DOCUMENT

Korean Registered Patent Publication No. 1904587 ("Patent Document 1")

DISCLOSURE

Technical Problem

The present invention has been made in view of the above problems, and it is an object of the present invention to provide a pouch-shaped battery cell capable of adjusting venting through a venting adjustment means mounted to a sealed portion of the pouch-shaped battery cell, from which an electrode lead protrudes, depending on the pressure of gas generated in the battery cell.

Technical Solution

In order to accomplish the above object, the present invention provides a pouch-shaped battery cell including an electrode assembly, a pouch-shaped battery case configured to receive the electrode assembly, and an electrode lead extending from the electrode assembly, a part of the electrode lead protruding outwards from the pouch-shaped battery case, wherein a sealed portion is formed at an outer periphery of the pouch-shaped battery case, a venting adjustment means is mounted to a part of the sealed portion in a direction in which the electrode lead protrudes, and the venting adjustment means adjusts opening and closing of the sealed portion having the venting adjustment means mounted thereto based on the pressure of gas in the pouch-shaped battery case.

Also, in the pouch-shaped battery cell according to the present invention, the venting adjustment means may be mounted to the sealed portion in a clip form.

Also, in the pouch-shaped battery cell according to the present invention, the sealed portion having the venting adjustment means mounted thereto may be more weakly fused than other sealing regions.

Also, in the pouch-shaped battery cell according to the present invention, the venting adjustment means may include an external main body portion and an inner elastic portion directly abutting the pouch-shaped battery case.

Also, in the pouch-shaped battery cell according to the present invention, the elastic portion may include an elastic material configured to be deformed by an inner pressure of the battery cell, and the main body portion may include a material configured not to be deformed by the inner pressure of the battery cell.

Also, in the pouch-shaped battery cell according to the present invention, the venting adjustment means may further include an electrode lead insertion hole configured to allow the electrode lead to be inserted therethrough.

Also, in the pouch-shaped battery cell according to the present invention, the electrode lead may be constituted by a positive electrode lead and a negative electrode lead, and the positive electrode lead and the negative electrode lead may protrude in opposite directions or the same direction.

In addition, the present invention provides a pouch-shaped battery cell manufacturing method including 1) manufacturing an electrode assembly, 2) joining an electrode lead to the electrode assembly, 3) receiving the electrode assembly having the electrode lead joined thereto in a pouch-shaped battery case, 4) hermetically sealing remaining outer peripheries of the pouch-shaped battery case excluding an outer periphery through which an electrolytic solution is injected, and 5) mounting a venting adjustment means to one of sealed portions of the pouch-shaped battery case in a direction in which the electrode lead protrudes, wherein the venting adjustment means adjusts opening and closing of the sealed portion having the venting adjustment means mounted thereto based on the pressure of gas in the pouch-shaped battery case.

Also, in the pouch-shaped battery cell manufacturing method according to the present invention, in step 4), the sealed portion having the venting adjustment means mounted thereto may be more weakly fused than other sealing regions.

Also, in the pouch-shaped battery cell manufacturing method according to the present invention, the venting adjustment means may include an external main body portion and an inner elastic portion directly abutting the pouch-shaped battery case.

Also, the pouch-shaped battery cell manufacturing method according to the present invention may further include injecting an electrolytic solution and hermetically sealing an electrolytic solution injection portion after step 5).

In addition, the present invention provides a battery pack including the pouch-shaped battery cell.

In addition, the present invention may provide various combinations of the above solving means.

Advantageous Effects

A pouch-shaped battery cell according to the present invention has an advantage in that a venting adjustment means is mounted to a sealed portion, whereby it is possible to automatically induce venting when the pressure in the pouch-shaped battery cell increases as the result of gas being generated in the pouch-shaped battery cell, and therefore it is possible to prevent explosion of the battery cell due to swelling thereof.

In addition, the pouch-shaped battery cell according to the present invention has an advantage in that, when the pressure in the pouch-shaped battery cell decreases after venting is performed by the venting adjustment means, the sealed portion is closed again, whereby it is possible to use the battery cell even after venting.

In addition, the pouch-shaped battery cell according to the present invention has an advantage in that a complicated process of forming a separate means for venting is not necessary at the time of manufacture of the pouch-shaped battery cell, whereby the manufacturing process is simplified.

DESCRIPTION OF DRAWINGS

FIG. 1 is a plan view showing a conventional pouch-shaped battery cell.

FIG. 2 is a sectional view taken along line A-A' of FIG. 1.

FIG. 3 is a plan view showing a pouch-shaped battery cell including a venting adjustment means according to an embodiment of the present invention.

FIG. 4 is a perspective view of the venting adjustment means according to the embodiment of the present invention.

FIG. 5 is a sectional view taken along line B-B' of FIG. 3.

FIG. 6 is a sectional view schematically showing a shape of the pouch-shaped battery cell of FIG. 3 when venting occurs.

FIG. 7 is a sectional view of a pouch-shaped battery cell including a venting adjustment means according to another embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

A pouch-shaped battery cell according to the present invention will be described with reference to the accompanying drawings.

FIG. 3 is a plan view showing a pouch-shaped battery cell including a venting adjustment means according to an embodiment of the present invention.

When describing the pouch-shaped battery cell 100 according to the present invention with reference to FIG. 3, the pouch-shaped battery cell 100 includes an electrode assembly 110, a battery case 120 configured to receive the electrode assembly 110, an electrode lead 130 joined to the electrode assembly 110, a part of the electrode lead protruding outwards from the battery case 120, and a venting adjustment means 140.

First, the electrode assembly 110 may be a jelly-roll type assembly, which is configured to have a structure in which a long sheet type positive electrode and a long sheet type negative electrode are wound in the state in which a separator is interposed therebetween, a stacked type assembly which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which battery cells are stacked and attached to each other in the state in which a separator is interposed therebetween. However, the present invention is not limited thereto.

The electrode assembly 110 is received in the pouch-shaped battery case 120.

The pouch-shaped battery case 120 is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the battery case from the outside, i.e. a thermally-bonded sealed portion between inner layers must exhibit excellent thermal bonding strength.

The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance, and excellent chemical resistance, is most preferably used.

The metal layer, which is disposed so as to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

A sealed portion 121 configured to hermetically seal the battery case 120 after the electrode assembly 110 is received in the battery case is formed at an outer periphery of the battery case 120.

In addition, the pouch-shaped battery cell 100 generally includes an electrode lead 130 constituted by a pair of a positive electrode lead and a negative electrode lead.

The electrode lead 130 is joined to tabs of the electrode assembly 110 by welding, and a part of the electrode lead protrudes outwards from the battery case 120 so as to be electrically connected to another battery cell or devices when the electrode assembly is received in the battery case 120.

Meanwhile, the positive electrode lead and the negative electrode lead may protrude in various directions. In general, however, the positive electrode lead and the negative electrode lead may protrude in opposite directions, or the positive electrode lead and the negative electrode lead may protrude in the same direction. In FIG. 3, as a non-limiting example, the positive electrode lead and the negative electrode lead are shown as protruding in opposite directions or different directions.

In addition, a lead film may be used in order to improve sealing between the electrode lead 130 and the battery case 120; however, the present invention is not limited thereto.

FIG. 4 is a perspective view of the venting adjustment means according to the embodiment of the present invention.

When describing the venting adjustment means 140 according to the present invention with reference to FIG. 4, the venting adjustment means 140 is mounted to the sealed portion 121 of the battery case 120, particularly the part of the sealed portion 121 from which the electrode lead 130 protrudes.

The venting adjustment means 140 includes a main body portion 141, an elastic portion 142, and an electrode lead insertion hole 143.

First, the main body portion 141, which is a portion that forms an external framework of the venting adjustment means 140, includes a material having a predetermined level of strength such that the main body portion is not deformed even though the sealed portion 121, to which the venting adjustment means 140 is mounted, is opened as the pressure in the battery cell 100 increases. It is preferable for the main body portion to be made of a metal material in consideration of strength and shapeability; however, the present invention is not limited thereto, and various kinds of materials may be used.

Next, the elastic portion 142, which is a portion that is located inside the main body portion 141 so as to contact the battery case 120, includes a material that is elastic so as to be deformed such that the sealed portion 121, at which the venting adjustment means 140 is mounted, can be opened when the pressure in the battery cell 100 increases to a predetermined value or more.

Any of various known rubber and polymer materials may be used as the elastic material.

The electrode lead insertion hole 143 is a through-hole configured to allow the electrode lead 130 to be inserted therethrough when the venting adjustment means 140 is mounted to the battery cell 100.

In FIGS. 3 and 4, the venting adjustment means 140 is shown as being disposed over one of four side surfaces of the battery cell 100 in each direction in which the electrode lead 130 protrudes; however, the present invention is not limited thereto. The venting adjustment means according to the present invention may be applied to any position of the sealed portion of the pouch-shaped battery case. In addition, the venting adjustment means may be disposed only at a part of the sealed portion, not the entirety of the sealed portion, and the venting adjustment means may be configured without the electrode lead insertion hole.

FIG. 5 is a sectional view taken along line B-B' of FIG. 3, and FIG. 6 is a sectional view schematically showing the shape of the pouch-shaped battery cell of FIG. 5 when venting occurs.

When describing the principle by which the venting adjustment means 140 is operated with reference to FIGS. 5 and 6, when the pressure in the battery cell 100 is a predetermined value or less, the sealed portion 121 remains closed, as shown in FIG. 5, and when the pressure in the battery cell 100 is the predetermined value or more, the sealed portion 121 is opened such that gas in the battery cell is discharged to the outside, as shown in FIG. 6.

When the gas is somewhat discharged and the pressure in the battery cell is lowered to the predetermined value or less, the sealed portion 121 is closed again.

That is, venting is adjusted based on the principle that, when the pressure in the battery cell is greater than the restoring force of the elastic portion 142, the sealed portion 121 is opened and venting occurs, and when the pressure in the battery cell is less than the restoring force of the elastic portion 142, the sealed portion 121 is closed.

Consequently, the pressure at which venting occurs may be appropriately adjusted depending on the kind and thickness of the material of which the elastic portion 142 is made.

Meanwhile, in FIGS. 5 and 6, an end 121a of the sealed portion and an inner surface 142a of the elastic portion are shown as being spaced apart from each other by a predetermined distance. Unlike FIGS. 5 and 6, however, the end 121a of the sealed portion and the inner surface 142a of the elastic portion may abut each other.

The reason for this is that, even in this case, gas can be discharged through a side surface of the venting adjustment means 140.

FIG. 7 is a sectional view of a pouch-shaped battery cell including a venting adjustment means according to another embodiment of the present invention.

The venting adjustment means 150 of FIG. 7 also includes a main body portion 151, an elastic portion 152, and an electrode lead insertion hole (not shown), and is different from the venting adjustment means 140 described above in that the elastic portion 152 is formed over the entirety of the surface of the venting adjustment means that abuts the battery case 120.

Since the elastic portion 152 is formed, as described above, there is an advantage in that it is possible to prevent a possibility of the battery case 120 being damaged by the main body portion 151 when or after the venting adjustment means 150 is mounted.

Meanwhile, a method of manufacturing a pouch-shaped battery cell 100 including a venting adjustment means 140 or 150 according to the present invention includes 1) a step of manufacturing an electrode assembly 110 using electrodes and a separator, 2) a step of joining an electrode lead 130 to the electrode assembly 110, 3) a step of receiving the electrode assembly 110 having the electrode lead 130 joined thereto in a pouch-shaped battery case 120, 4) a step of hermetically sealing the remaining outer peripheries of the battery case 120 excluding an outer periphery through which an electrolytic solution is injected, and 5) a step of mounting a venting adjustment means 140 or 150 to one of sealed portions 121 of the battery case 120 in a direction in which the electrode lead 130 protrudes.

The pouch-shaped battery cell manufacturing method further includes a step of injecting an electrolytic solution and a step of hermetically sealing an electrolytic solution injection portion after the step of mounting the venting adjustment means 140 or 150.

Here, a thermal fusion method is generally used as a method of hermetically sealing the outer peripheries of the battery case. In the step of hermetically sealing the remaining outer peripheries of the battery case excluding the outer periphery through which the electrolytic solution is injected, the outer peripheries of the battery case may be hermetically sealed at the same fusion strength; however, it is preferable for the sealed portion 121 in the direction in which the electrode lead 130 protrudes to be more weakly fused than the sealed portions 121 in other different directions in order to guide gas to be discharged in a direction in which the venting adjustment means 140 or 150 is mounted.

That is, it is preferable for the fusion strength of the sealed portion 121 to which the venting adjustment means 140 or 150 is mounted to be set within a range within which the sealed portion can be split off at pressure lower than the inner pressure at which the venting adjustment means 140 or 150 is opened.

Of course, all of the sealed portions 121 may be hermetically sealed at the same fusion strength, and then joining strength of the remaining sealed portions 121 excluding the sealed portion 121 to which the venting adjustment means 140 or 150 is mounted may be increased using an additional method such that the joining strength of the sealed portion 121 to which the venting adjustment means 140 or 150 is mounted is relatively weak.

Even in this case, however, it is preferable for the joining strength of the sealed portion 121 to be set within a range within which the sealed portion can be split off at pressure lower than the inner pressure at which the venting adjustment means 140 or 150 is opened, as described above.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Battery cell
10, 110: Electrode assemblies
11: Electrode tab
20, 120: Battery cases
21, 121: Sealed portions
121a: End of sealed portion
30, 130: Electrode leads
40: Lead film
50: Main gas discharge pipe
60: Auxiliary gas discharge pipe
140, 150: Venting adjustment means
141, 151: Main body portions
142, 152: Elastic portions
142a: Inner surface of elastic portion
143: Electrode lead insertion hole

The invention claimed is:

1. A pouch-shaped battery cell comprising:
an electrode assembly;
a pouch-shaped battery case configured to receive the electrode assembly; and
an electrode lead extending from the electrode assembly, a part of the electrode lead protruding outwards from the pouch-shaped battery case, wherein
the pouch-shaped battery case having a sealed portion at an outer periphery thereof,
a venting adjustment member coupled to a first portion of the sealed portion, the venting adjustment member extending along a direction in which the electrode lead protrudes, and
the venting adjustment member configured to adjusts an opening and closing of the sealed portion based on a pressure of a gas in the pouch-shaped battery case wherein the venting adjustment member comprises an external main body portion and an inner elastic portion, the inner elastic portion directly abutting the pouch-shaped battery case.

2. The pouch-shaped battery cell according to claim 1, wherein the venting adjustment member is mounted to the sealed portion as a clip.

3. The pouch-shaped battery cell according to claim 1, wherein the first portion of sealed portion is more weakly fused than other sealed portions.

4. The pouch-shaped battery cell according to claim 1, wherein the elastic portion comprises an elastic material configured to be deformed by an inner pressure of the battery cell, and the main body portion comprises a material configured not to be deformed by the inner pressure of the battery cell.

5. The pouch-shaped battery cell according to claim 1, wherein the venting adjustment member further comprises an electrode lead insertion hole configured to allow the electrode lead to be inserted therethrough.

6. The pouch-shaped battery cell according to claim 1, wherein the electrode lead includes a positive electrode lead and a negative electrode lead, the positive electrode lead and the negative electrode lead protruding in opposite directions.

7. The pouch-shaped battery cell according to claim 1, wherein the electrode lead includes a positive electrode lead and a negative electrode lead, the positive electrode lead and the negative electrode lead protruding along the same direction.

8. A pouch-shaped battery cell manufacturing method comprising:
1) manufacturing an electrode assembly;
2) joining an electrode lead to the electrode assembly;
3) placing the electrode assembly having the electrode lead joined thereto in a pouch-shaped battery case;
4) hermetically sealing a first portion of an outer periphery of the pouch-shaped battery case to form a sealed portion; and
5) mounting a venting adjustment member to a portion of the sealed portion in a direction along which the electrode lead protrudes, wherein
the venting adjustment member is configured to adjusts an opening and closing of the portion of the sealed portion having the venting adjustment member mounted thereto based on a pressure of gas in the pouch-shaped battery case wherein the venting adjustment member comprises an external main body portion and an inner elastic portion, the inner elastic portion directly abutting the pouch-shaped battery case.

9. The pouch-shaped battery cell manufacturing method according to claim 8, wherein, the step of hermetically sealing includes hermetically sealing the first portion such that the portion of the sealed portion having the venting adjustment member mounted thereto is more weakly fused than other sealing portions.

10. He pouch-shaped battery cell manufacturing method according to claim 8, further comprising injecting an electrolytic solution and hermetically sealing an electrolytic solution injection portion after the step of mounting the venting adjustment member.

11. A battery pack comprising the pouch-shaped battery cell according to claim 1.

* * * * *